United States Patent [19]
Gliemeroth

[11] 3,902,909

[45] Sept. 2, 1975

[54] PHOTOTROPIC MATERIAL AND A METHOD FOR ITS PRODUCTION

[75] Inventor: Georg Gliemeroth, Mainz, Germany

[73] Assignee: Jenaer Glaswerk Schott & Gen., Germany

[22] Filed: Sept. 11, 1974

[21] Appl. No.: 505,097

Related U.S. Application Data

[63] Continuation-in-part of Ser. No. 203,380, Nov. 30, 1971, abandoned.

[30] Foreign Application Priority Data

Dec. 10, 1970 Germany............................ 2060748

[52] U.S. Cl. .................... 106/39.6; 65/33; 106/53; 106/54; 106/DIG. 6
[51] Int. Cl.².... C03C 3/26; C03C 3/22; C03C 3/08
[58] Field of Search ............ 106/DIG. 6, 52, 54, 53; 65/33

[56] References Cited
UNITED STATES PATENTS

| | | | |
|---|---|---|---|
| 2,435,995 | 2/1948 | Armistead............................ | 106/54 |
| 3,615,771 | 10/1971 | Meiling................................. | 106/54 |
| 3,650,781 | 3/1972 | Baak..................................... | 106/52 |
| 3,655,376 | 4/1972 | Wood et al. ........................ | 106/39.6 |

OTHER PUBLICATIONS

Biggers, J. V. et al., "Thick–Film Glass–Ceramic Capacitors" Solid State Technology – May, 1970, pp. 63–66.

*Primary Examiner*—Helen M. McCarthy
*Attorney, Agent, or Firm*—Hill, Gross, Simpson, Van Santen, Steadman, Chiara & Simpson

[57] ABSTRACT

A phototropic glass composition which is devoid of halogen, rare earths, tungsten and molybdenum and which comprises a phase separated melt-fused glass composition containing from about 70 to 95 weight percent CdO, from about 2 to 28 weight percent $B_2O_3$, and from about 2 to 28 weight percent of $SiO_2$. Minor proportions of certain other metal oxides, such as the oxides of Ag, Au, Bi, Cu, Hg, In, Pb, Sb, Sn or Te may also be incorporated within the glass composition.

3 Claims, 3 Drawing Figures

PHOTOTROPIC MATERIAL AND A METHOD FOR ITS PRODUCTION

CROSS-REFERENCE TO RELATED APPLICATION

This application is a continuation-in-part of U.S. Pat. application Ser. No. 203,380, filed Nov. 30, 1971, now abandoned which is incorporated herein by reference.

BACKGROUND OF THE INVENTION

As the art appreciates, the term "photochemistry" indicates combined chemical or physical-chemical changes or reactions in material condition produced by the action of light, these changes in condition extend from oxidation to reduction and beyond to decomposition-, addition-, polymerization- and dimerization-reactions as well as to photodielectric, photomechanical, photoelectrical, photosensitive, phototropic, and photoluminescence reactions. Phototropy is, in this connection, defined exclusively as an alteration of the transparency or of the light-diffusion characteristics of a material, such as a glass, which is proportional to the intensity of the action of incident light, and phototropic effects are clearly delimited as compared with photochemical, photoelectrical, and other photochemical effects, in which some characteristic other than light transparency or light-diffusion of an illuminated material is of interest in view of, or as a result of, incident light-radiation thereupon. Also, in this connection, it will be appreciated that chemical reactions are known whose speed or rate is accelerated by means of additionally supplied light-energy. In general, the term "light", as used herein, is not limited to the visible spectrum, but includes also the adjacent ultraviolet and infra-red spectral-ranges. All these different changes or reactions are related to one another in that they are based on the excitation of an atom or molecule through absorption of a photon, namely, through the irradiation of such atom or molecule with light. The differences between these various effects, however, are recognized in and shown by such works of literature as: FRANKE, Lexikon der Physik, (Lexicon of Physics), Franckn'sche Verlagshandlung Stuttgart, 1969, Vol. II: KOSAR, Light-Sensitive Systems, John Wiley & Sons, Inc., New York, 1965; Symposium on Unconventional Photographic Systems, Bureau of Naval Weapons, Washington, D.C. 1964.

Silicate phototropic glasses having a silver-halide base are known, for example, from the U.S. patents to Eppler and Stookey (Glass Composition and Method of Producing A Transparent Phototropic Body, U.S. Pat. No. 3,197,296), and Armistead and Stookey (Phototropic Material and Article Made Therefrom, U.S. Pat. No. 3,208,860), and others. Also, non-silicate glasses having a silver-halide base may possess phototropy, as is apparent from the German Patent of Gliemeroth (Phototropic Glass, German Pat. No. 1,596,847), A summary of phototropic glasses having silver-halogen bases has been made by Gliemeroth and Mader in Angew, Chem., 82 annual publication 1970 No. 11, pages 421–433, or Angew, Chem., International Edition, Academic Press Inc., New York, Volume 9, 1970, No. 6, pages 434–445.

Although the search for a phototropic glass without silver and without halogen has, up to now, not led to a practical commercial product, some early investigations and patents have sought to develop a glass with phototropic characteristics, which, as far as possible, is devoid of silver and halogen.

For example, U.S. Pat. No. 3,255,026 (Stroud, Phototropic Glass Composition) discloses silver and halogen-free phototropic glasses. The reduced silicate glasses described in this patent consist essentially of 74–75% $SiO_2$, 24–25% $Na_2O$, 0.005–1.0% $Ce_2O_3$ and 0.005–1.0% MnO. Similar phototropic silver-free silicate glasses are also disclosed in the U.S. Pat. Nos. 3,278,319 and 3,269,847 (Cohen, Phototropic Glass and Method). The glasses described in these patents comprise lime-sodium-silicate glasses, which are doped with europium or ceric oxide, respectively.

U.S. Pat. No. 3,615,771 (Meiling, Photochromic Glass) describes phototropic glasses comprised of about 45 to 70 mole percent CdO, about 10 to 45 mole percent $B_2O_3$, and about 5 to 35 mole percent $SiO_2$.

A modification of silver-halogen-containing phototropic silicate glasses is described in U.S. Pat. No. 3,293,052 (Sawchuk and Stookey, Glass Article and Method of Making It) and in U.S. Pat. No. 3,325,299 (Araujo, Phototropic Glass Article and Method of Making It). Sawchuk and Stookey suggest replacement of the halogen components of the sliver-halogen-containing silicate glasses by molybdates and tungstenates, so that by means of a suitable temperature treatment (as is also known from the phototropic glasses of a silver-halide base, compare Gliemeroth and Mader, supra), a silver-molybdate- or silver-tungstenate-phase is produced. Araujo, on the other hand, suggests replacing the silver-components of the phototropic glasses having a silver-halide base by copper or cadmium, so that by a precise temperature-treatment of these glasses, instead of the earlier mentioned silver-halide phase, a copper-halide, cadmium-halide, or mixed copper and cadmium-halide phase, is produced.

Prior art phototropic glass compositions having a silver-halide base have certain disadvantages which have stimulated the search for alternatives and improvements. For one thing, such prior art glasses characteristically have a sensitivity which is very great compared to the radiation exciting phototropy characteristics; for some applications of use, this excitation sensitivity is too great. For another thing, the prior art silver-halogen-containing phototropic glasses possess a very strong dependence on temperature for the phototropy characteristics.

Further, the melting of halogen-containing mixtures to a glass causes technological difficulties with reference to the vesicular structure of the resultant glass and, in view of the characteristic evaporation of halogen components which occurs during the melting, special protective precautions must be taken for the personnel and the environment.

Further, the price of halogen-containing mixture-components, particularly of bromium-components, is very high, particularly if one takes into consideration the losses generated by evaporation during the melting of the components.

BRIEF SUMMARY OF THE INVENTION

The invention provides a class of cadmium oxide glass compositions which are phototropic and which, surprisingly and unexpectedly, in view of the prior art teachings, contain no halogen, rare earths, tungsten or molybdenum. Such compositions are produced by the melt fusion of an oxide composition followed by heat treatment thereof to produce a product having a glass (vitreous) continuous phase with a discontinuous or separated crystalline phase therein. This product, on a bulk basis, contains from about 70 to 95 weight percent of cadmium oxide, together with boron oxide and silica. Such compositions are in a glass (or vitreous) form and are produced by heat treatment of a member of a class of starting, substantially non-phototropic, oxide compositions.

A primary object of the present invention is to provide a phototropic glass material, which is free from halogens, rare earths, tungsten and molybdenum.

Another object is to provide improved phototropic glass compositions which largely avoid the problems associated with the use of prior art phototropic glass compositions containing silver halide.

Other and further objects, purposes, advantages, aims, utilities and features will be apparent to those skilled in the art from a consideration of the present specification and drawings.

DESCRIPTION OF THE PREFERRED EMBODIMENTS

Figure 1:
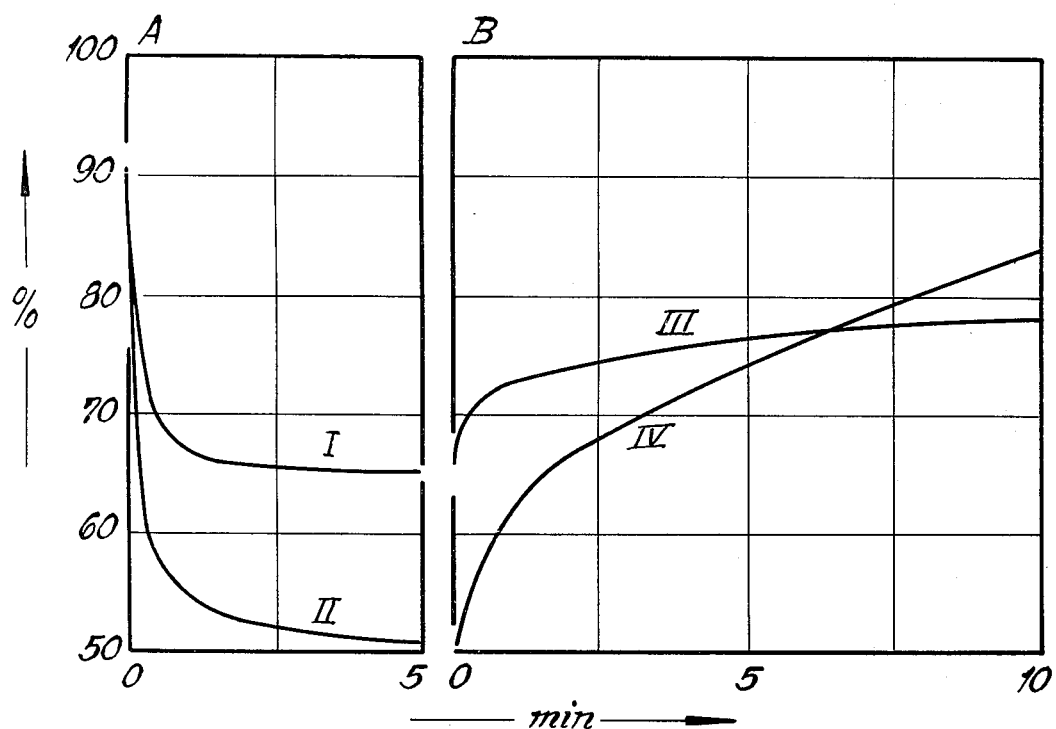
FIG. 1 graphically illustrates two graphs, each indicating the darkening behavior and regeneration of glass compositions I, II, III and IV in accordance with the invention; in each graph, the abscissa is time in minutes and the ordinate is percent of total light transmission.

The present invention provides a class of phototropic glass compositions which are devoid of halogen, rare earths, tungsten and molybdenum. This glass of glass compositions is comprised, on a 100 weight percent total bulk composition basis, of the following starting oxide materials:

From about 70 to about 95 weight percent CdO
From about 2 to about 28 weight percent $SiO_2$
From about 2 to about 28 weight percent $B_2O_3$ These oxides are melt-fused at a temperature of from about 900° to 1300° C. and then the so-melt-fused composition is subjected to a heat treatment which comprises holding the melt-fused composition at a temperature of from about 350° to 1100° C. for a time of from about 0.4 to about 2.5 hours.

The resulting glasses characteristically display half fading times in the range from about 2 to 4 minutes, which is in marked contrast to prior art phototropic compositions containing no halogen, rare earths, tungsten and molybdenum, such as the glasses of Meiling in U.S. Pat. No. 3,615,771, where the half fading time is on the average about 30 minutes and apparently at best only about 10 minutes.

In general, in preparing a member of the class of phototropic glass compositions of this invention, the following procedure is employed: First, one prepares a uniform, physical mixture of a composition of the starting oxide materials within the respective weight percentage ranges indicated above. These oxides are in a finely divided form, usually under about 1.0 millimeters (mm) in individual particle average diameter, and preferably in the size range of from about 0.06 to 0.40 mm.

Then, one melt fuses such composition at temperatures in the range from about 900° to 1300° C. (preferably from about 950° to 1100° C.). Fusion times in the range of from about 0.3 to 4 hours are typical, though longer and shorter times may be used, as those skilled in the art will appreciate. Preferably, this heating is conducted in an inert environment (such as a platinum crucible under an inert gas blanket) with care being taken to minimize the loss of any volatile components present, though any suitably convenient procedure may be employed, as those skilled in the art will appreciate.

The resultant melt-fused mass thus produced may be regarded as an intermediate composition in respect to the phototropic glass compositions of the invention. Thus, such a melt may be either allowed to cool into a solid material, or it may be further processed directly into a particular phototropic glass composition of the invention, as desired. Preferably, a cooling rate of about 70° per hour is utilized.

An intermediate glass, which has thus been simply cooled, typically does not display phototropic qualities. Such a glass may be in a substantially completely vitreous state, or it may be in a substantially complete or partial crystalline state, depending upon the procedure employed in cooling, as those skilled in the art will appreciate. Such a glass may be transparent or opaque, and may possess a variety of different colors (by transmission or reflection of incident light). In normal operation, the color depends upon the oxidation/reduction relation during the fusion or melting process. Under normal oxidation conditions (air), a reddish-yellow-orange color is generally achieved. Such an intermediate glass, before being heat treated to make a phototropic glass of the invention, is in a substantially completely vitreous form.

To convert such an intermediate glass vitreous form, into a phototropic glass of the invention or to convert a heated, melt-fused oxide mixture into a phototropic glass of the invention, one heats or maintains such intermediate product at generally a temperature in the range of about 350° to 1100° C. and more preferably from about 370° to 695° C. and most preferably from about 395° to 555° C. for a time of from about 0.4 to 2.5 hours.

Preferably, after being so heat treated, the resulting composition is cooled at the rate of from about 55° to 78° C. per hour down to ambient temperatures (e.g. about 20° C.).

Minor amounts of compatible metal oxides such as the oxides of Ag, Au, Bi, Cu, Hg. In, Pb, Sb and Te may also be included in the foregoing high cadmium oxide glass compositions. The total amount of all such minor components should not exceed about 5 weight percent of the total bulk composition.

Thus, the invention generally provides a basic three-substance glass system comprised of $CdO-B_2O_3-SiO_2$ wherein the amount of each substance may vary over a relatively small range. Such basic glass systems may be modified by additions of less than about 5 weight percent of certain metal oxides enumerated earlier. Glasses formed from such a system exhibit phototropic characteristics, that is, blackening or darkening in the visible spectral range upon optical excitation and a regeneration of the darkened condition to a lighter or colorless condition upon termination of the optical excitation.

The glass series of the invention possess, without a content of halogens, rare earths, tungsten or molybdenum, either phototropic characteristics as glass or through a heat-treatment may be converted to a vitreous (phase-separated) condition, sometimes referred to as a glass-ceramic condition which exhibits phototropic characteristics.

Figure 3:
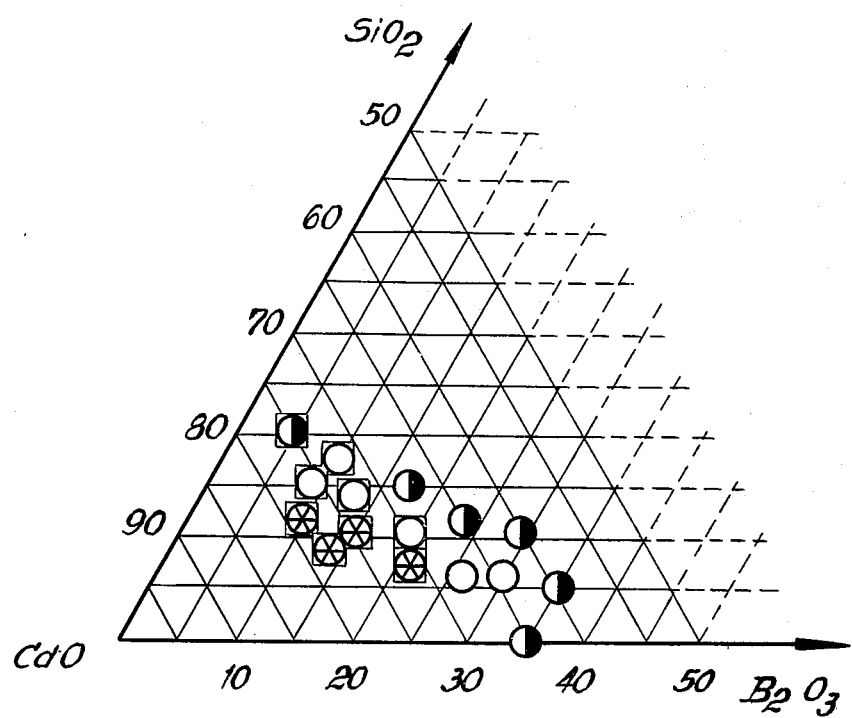
FIG. 3 illustrates a ternary graph of a three-substance system $CdO-SiO_2-B_2O_3$ in weight percentages based on a 100 weight percent total system composition.

FIG. 3 illustrates the system $CdO-SiO_2-B_2O_3$ as a ternary system in a conventional manner, wherein the individual points correspond to the runs set forth below in Table I. Crystallizing compositions are denoted by a small star, vitreously rigidified melts are denoted by a circle and phase-separated melts are denoted by a half-circular black area. Compositions which exhibit phototropic characteristics are further denoted by a square. As is apparent from FIG. 3, the limits of phototropic characteristics for glasses of the invention are independent of whether a melt crystallizes or vitreously rigidifies or is inclined to phase-separation and appears to be related to a minimum cadmium oxide-content of about 65 weight percent.

FIG. 1, part A, curve II, graphically indicates the blackening behavior of a typical glass-ceramic composition of the invention. The regeneration of such a glass-ceramic, i.e., the decrease of absorption in dependence on time is indicated at FIG. 1, part B, curve IV.

The invention allows the production of thin phototropic glass layers on desired organic or inorganic substrates through vaporization techniques or by the application of organogenic solutions and subsequent hydrolysis and/or pyrolysis, as well as through other methods.

In some glasses formed from the system $CdO-B_2O_3-SiO_2$ of the invention, large vitreous separations having dimensions as large as 500 A and concentrations of heavy metals are observable with appropriate means, such as for example a SIEMENS electronmicroscope Type 1A, having up to a 300,000 magnitude enlargement. Other glasses of the three-substance system of the invention contain no detectable decompositions but are nevertheless phototropic.

The present invention is further illustrated by reference to the following Examples. As those skilled in the art will appreciate, other and further embodiments are obvious and within the spirit and scope of the invention from the teachings of the Examples set forth below, taken in conjunction with the accompanying specification and drawings.

EXAMPLE 1

A batch composed of the following raw materials was weighed in and mixed thoroughly:

439.5 g. cadmium oxide, p.a.-quality, water-free
138.5 g. boric oxide (as $H_3BO_3$ of purest quality)
84.2 g. purified, finely ground silicon oxide (as quartz).

Figure 2:
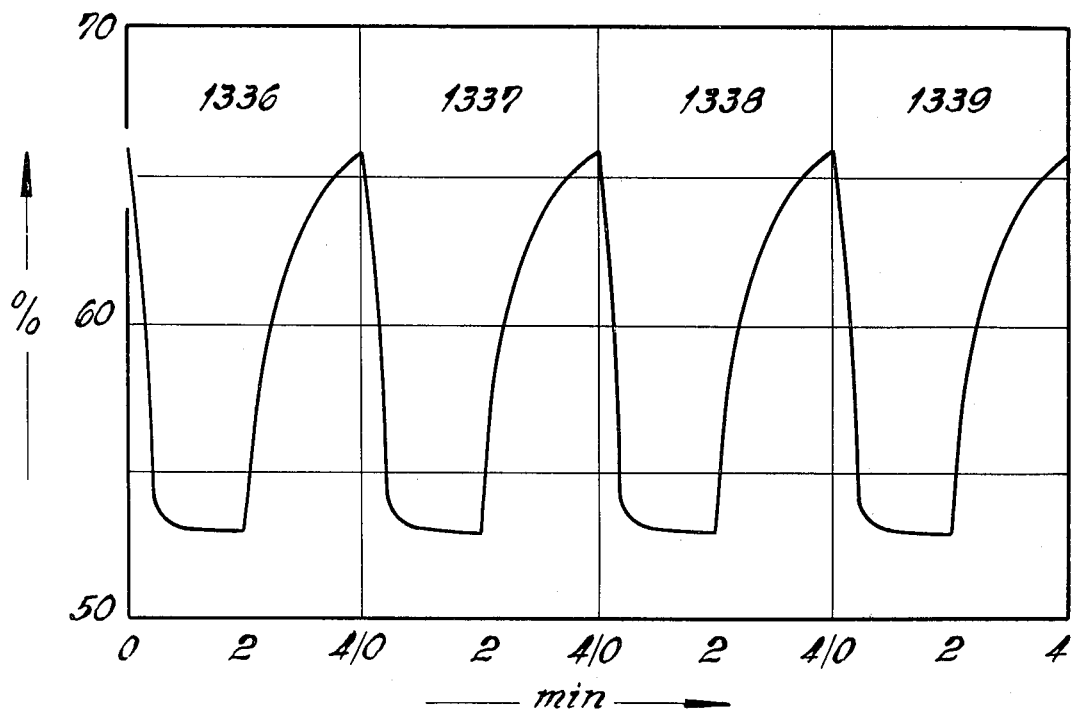
FIG. 2 graphically illustrates the reproducibility of the regeneration of the glass ceramic, with the abscissa being time in minutes and the ordinate being percent of total light transmission.

This batch was introduced into a platinum crucible heated at 1050° C. to 1100° C., melted for 30 minutes at 1050° C. and clarified. The batch was then cooled to 950° C. and at the same time was homogenized with a platinum agitator. The batch was then poured into metal molds for annealing or post-fusion heat treatment whereby the temperature dropped quickly to about 850° C., and then was cooled at a speed of about 70° C. per hour from 600° C. to room temperature. The product was a yellowish-brown glass, which became somewhat more brown in daylight. No metallic separations were noticeable in the glass, either with a microprobe or with an electron microscope. A test piece was formed from this glass, which had dimensions of 20 × 20 × 2 mm and was polished on both main surfaces. The phototropy characteristics of this test piece were readily observed without difficult. The change in the optical transmission in percent was observed in accordance with Gliemeroth and Mader (supra) in dependence on time; and this glass has the behavior illustrated in FIG. 1. In FIG. 1, part A, curve I, there is illustrated the lowering of light transmission at 545 mm at 20° C. of a 2 mm thick two-sided polished sample during irradiation with a constant xenon light (8000 lx) in relation to time (min.) and part B, curve III, illustrates the regeneration at 20° C. after discontinuance of the excitation light (xenon light). As used herein, the abbreviation "nm" designates wavelength and the abbreviation "lx" designates light intensity in luxes. The change in color which occurs upon illumination goes into the gray. The half-value time of the regeneration, that is, the time during which the blackening has gone back after illumination to one-half, in this connection is shown in FIG. 1 to be about 2.5 minutes for the glass of Example 1. The phototropy shows no fatiguing effect and the reproduceability thereof is shown in FIG. 2, which illustrates the 1335th to the 1340th cycle of light-dark-changes without change in phototropic characteristics.

Using the fusion and heat treatment procedure of Example 1, a series of $SiO_2-B_2O_3CdO$ glasses were prepared and evaluated in the manner of Example 1 (above) for phototropic activity. The results are summarized below in Table I.

TABLE I

| Run No. | Composition In Wt. % Total | | | Total Weight of Glass | Condition After | | Phototropy of the Glass |
|---|---|---|---|---|---|---|---|
| | SiO | $B_2O_3$ | CdO | | Quenching | Cooling | |
| 1 | 8.5 | 13.1 | 78.4 | 500 g | crystalline | crystalline | strong |
| 2 | 10.0 | 20.0 | 70.0 | 700 g | vitreous | vitreous | weak |
| 3 | 10.0 | 15.0 | 75.0 | 500 g | some crystals | some crystals | moderate |
| 4 | 15.0 | 9.0 | 76.0 | 600 g | vitreous | vitreous | strong |
| 5 | 5.0 | 35.0 | 60.0 | 600 g | phase separated | phase separated | none |
| 6 | 12.0 | 10.0 | 78.0 | 600 g | some surface crystals | crystals | strong |
| 7 | 15.0 | 17.0 | 68.0 | 600 g | phase separated | phase separated | none |
| 8 | 10.0 | 29.0 | 61.0 | 600 g | phase separated | phase separated | none |
| 9 | 14.0 | 13.0 | 73.0 | 600 g | vitreous | vitreous | strong |
| 10 | 7.0 | 26.0 | 67.0 | 600 g | vitreous | vitreous | none |
| 11 | 12.0 | 23.0 | 65.0 | 500 g | phase separated | phase separated | none |
| 12 | 6.0 | 23.0 | 64.0 | 500 g | vitreous | vitreous | none |
| 13 | 20.0 | 5.0 | 75.0 | 500 g | phase separated | phase separated | one phase phototr. |
| 14 | 7.0 | 22.0 | 71.0 | 500 g | surface crystals | crystals | weak |
| 15 | 17.0 | 10.0 | 73.0 | 700 g | vitreous | vitreous | weak |
| 16 | | 35.0 | 65.0 | 700 g | phase separated | phase separated | none |

TABLE I-continued

| Run No. | Composition In Wt. % Total | | | Total Weight of Glass | Quenching | Condition After Cooling | Phototropy of the Glass |
|---|---|---|---|---|---|---|---|
| | SiO | B$_2$O$_3$ | CdO | | | | |
| 17 | 20.0 | 9.0 | 71.0 | 500 g | vitreous | crystalline | weak |

As may be ascertained from Table I, the limits of the invention in terms of, for example, CdO content, may be ascertained from the phototropy characteristics thereof (Table I, last column).

Minor proportions, i.e., less than 5 weight percent of the total bulk composition, of oxides of metals selected from the group consisting of Hg, Hu, Bi, Cu, Hg, In, Pb, Sb and Te may be intermixed with the raw materials of the glass formed in Example I and melt-fused and heat-tempered as set forth above to produce useful phototropic glasses.

The foregoing is considered as illustrative only of the principles of the invention and changes may readily occur to those skilled in the art. Accordingly, it is not desired to limit the invention to the exact compositions and treatments shown and described and all suitable modifications, substitutions and equivalents may be resorted to which fall within the spirit and/or scope of the invention as claimed.

I claim as my invention:

1. A phototropic glass composition prepared from a starting composition comprising on a 100 weight percent basis, from about 70 to 95 weight percent CdO
   from about 2 to 28 weight percent SiO$_2$
   from about 2 to 28 weight percent B$_2$O$_3$,
   said glass composition having been prepared by the steps of:
   a. melt-fusing said starting composition at a temperature of from about 900° to 1300° C.,
   b. heat-treating said melt-fused, substantially non-crystalline product at a temperature of from about 350° to 1100° C. for a time of from about 0.4 to 2.5 hours, and
   c. cooling the resulting heat-treated composition to ambient temperature at a rate of from about 55° to 78° C. per hour.

2. A phototropic glass composition as defined in claim 1 wherein the weight percent of CdO in the starting composition is about 73 to 79 weight percent.

3. A phototropic glass composition as defined in claim 1 which also includes up to 5 weight percent of an oxide of a metal selected from the group consisting of Ag, Au, Bi, Cu, Hg, In, Pb, Sb, Sn and Te.

* * * * *